United States Patent [19]

Hicks

[11] 4,058,289

[45] Nov. 15, 1977

[54] FAUCET VALVE

[76] Inventor: Glenn W. Hicks, 2749 N. 75th St., Milwaukee, Wis. 53210

[21] Appl. No.: 622,150

[22] Filed: Oct. 14, 1975

[51] Int. Cl.$^2$ .............................................. F16K 5/00
[52] U.S. Cl. .................................. 251/304; 251/310; 251/209; 251/172; 251/317; 137/606; 251/368
[58] Field of Search ............... 251/304, 310, 209, 172, 251/316, 317, 192, 309, 368; 137/606

[56] References Cited

U.S. PATENT DOCUMENTS

| 704,522 | 7/1902 | Douglas | 251/310 |
|---|---|---|---|
| 3,353,785 | 11/1967 | Eggers | 251/310 |
| 3,645,493 | 10/1970 | Manoogian | 251/310 |
| 3,700,210 | 7/1971 | Manoogian | 251/304 |
| 3,913,612 | 10/1975 | Tolnai | 251/172 |
| 3,923,284 | 9/1974 | Stickler et al. | 251/172 |

FOREIGN PATENT DOCUMENTS

| 210,694 | 8/1960 | Austria | 251/310 |
|---|---|---|---|
| 49,086 | 4/1889 | Germany | 251/310 |
| 92,690 | 1/1937 | Sweden | 251/310 |
| 863,695 | 1/1958 | United Kingdom | 251/310 |

Primary Examiner—William R. Cline
Assistant Examiner—H. Jay Spiegel

[57] ABSTRACT

A valve assembly including a hollow, generally cylindrical housing having spaced inlet and outlet ports, a generally circular valve member disposed coaxially within the housing between the inlet and outlet ports, and an eccentrically apertured body member disposed coaxially within the housing, and having a contact surface slidably engaged by the valve member. A sealing member engages an opposite surface of the body member and includes a projecting neck portion which extends into the eccentric opening in the body member and has an opposite end which engages the valve member. The valve member is rotatable about the axis of the housing and has a non-concentric aperture movable upon rotation of the valve member into and out of registry with a non-concentric opening in the sealing member neck portion.

3 Claims, 3 Drawing Figures

FAUCET VALVE

BACKGROUND OF THE INVENTION

This invention relates to faucet valves. One type of commonly used facuet has separate valves for hot and cold water lines and coupled to a common spout. Valves of this type generally include a washer mounted on a valve stem which is movable into and out of engagement with a valve seat. Such washers are inherently subject to wear and deformation as a result of the compression of the washer against the valve seat. One type of a prior art faucet valve designed to eliminite the inherent deficiencies of compression type valves includes a valve element having a generally planer surface disposed in sliding engagement with a corresponding planer surface in the valve housing and wherein a non-concentric opening through the valve member is movable into and out of registry with a corresponding opening in the planer housing surface. Such prior art faucet assemblies also included a generally cup-shaped seal disposed between the opening in the planar housing surface and the housing inlet, and which was received within a counter-sunk opening and biased into closed position by means of a spring. While such prior art faucet assemblies effectively minimized seal wear, the non-concentric opening in the planer faucet surface and the opening for the cup-shaped seal member required expensive machine operations and in addition the seal biasing spring tended to be noisy as a result of water flow therethrough.

SUMMARY OF THE INVENTION

It is an object of the invention to provide a new and improved faucet valve of the non-compression type.

Another object of the invention is to provide a non-compression type faucet valve which does not require a sealing member biasing spring.

A still further object of the invention is to provide a faucet valve wherein machining operations are minimized.

These and other objects and advantages of the present invention will become more apparent from the detailed description thereof taken with the accompanying drawings.

The foregoing and other objects of the invention are accomplished by means of a valve assembly including a hollow housing for enclosing a rotatable valve member disposed between spaced inlet and outlet ports, an eccentrically apertured body member having a first surface slidably engaged by the valve member and a second surface spaced from the first surface, and a sealing member disposed coaxially within the housing and having a surface in sealing engagement with the second surface on the body member and a portion sealingly projecting into the eccentric opening and engaging the valve member. The valve member has an eccentric opening which is movable into and out of registry with the opening in the projecting portion of the sealing member whereby the sealing member is biased toward engagement with the body member under the influence of normal water pressure.

DESCRIPTION OF THE PREFERRED EMBODIMENT

Figures 1, 2, 3:
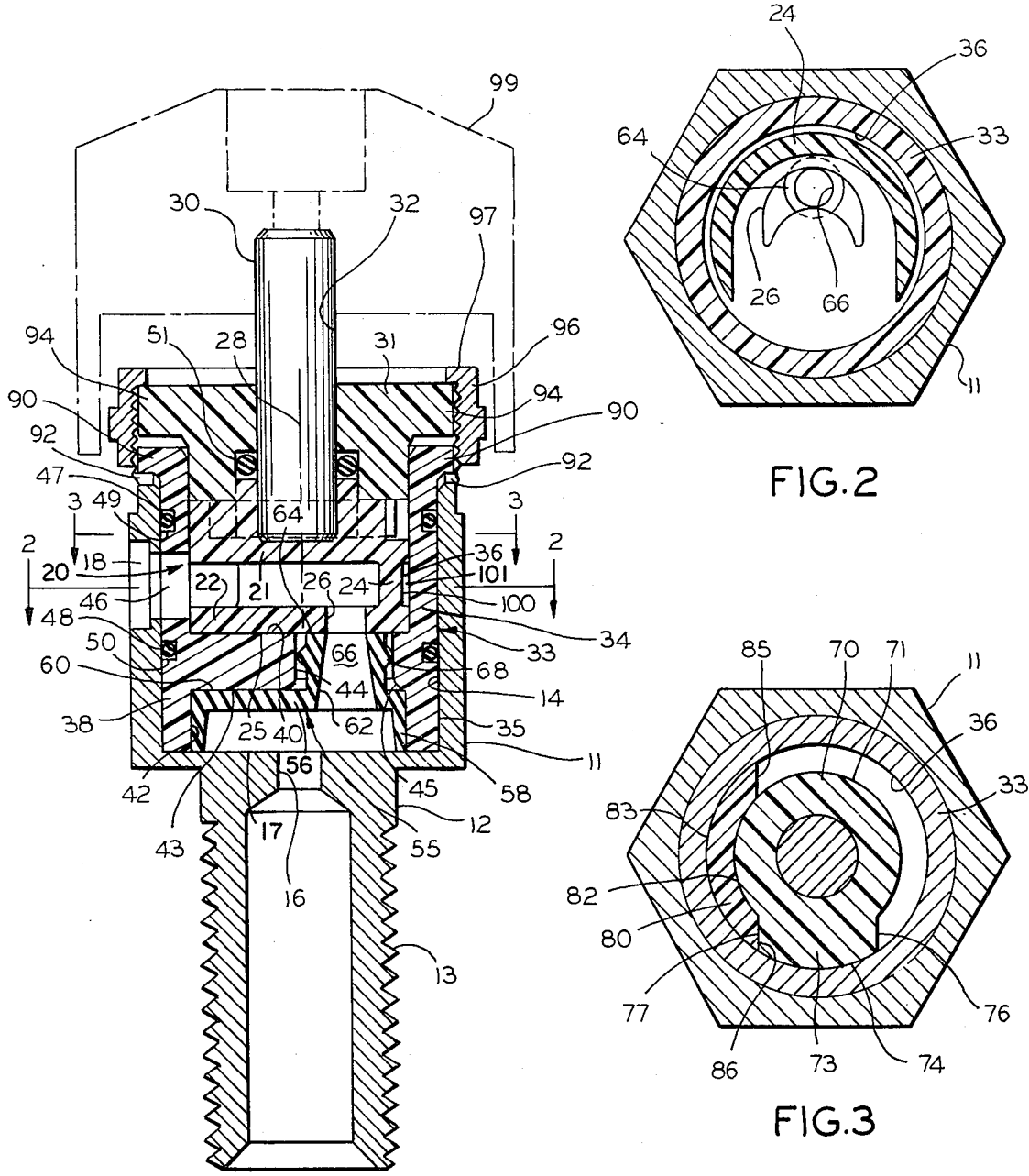
FIG. 1, is a side elevational view, partly in section, of a faucet valve assembly according to the present invention.
FIG. 2, is a view taking along lines 2—2 of FIG. 1.
FIG. 3, is a view taken along lines 3—3 of FIG. 1.

The faucet valve 10 according to the preferred embodiment of the invention is shown in FIG. 1 to include a generally cylindrical valve body 11 and a coaxial inlet portion 12 of reduced diameter and which has external threads 13 for connection in a conventional manner to either a hot or cold water line (not shown). The body portion 11 has an internal cylindrical bore 14 which is connected at its lower end to its inlet portion 12 by means of a concentric inlet opening 16 formed in the base 17 of body 11. In addition, an exit opening 18 is formed in one side of the housing with the axes of openings 16 and 18 intersecting at an angle of approximately 90°.

A valve member 20 is disposed within the body portion 11 and is generally defined by upper and lower generally disclike portions 21 and 22 respectively which are spaced apart in a generally parallel relation and are interconnected by means of an axially extending web portion 24 which is generally C-shaped in transverse cross-section as seen in FIG. 2. The lower portion 22 of valve member 20 has a generally planer lower surface 25 and a generally kidney-shaped aperture 26 formed therethrough and spaced laterally from the axis 28 about which the valve member 20 is rotatable. The upper portion 21 of valve member 20 is imperforate and has the lower end of a valve stem 30 embedded in its upper end.

A closure member 31 may be disposed in the upper end of the bore 14 of housing 11 and includes a central aperture disposed in closely surrounding relation to stem 30 and above valve member 20. In addition, a body member 33 is disposed in body portion 11 and includes a cylindrical portion 34 whose outer surface 35 engages the bore 14 and which in turn has a cylindrical bore 36 which rotatably receives the valve member 20 is a coaxial relation. Body member 33 also includes a base portion 38 which is disposed between the valve member 20 and the inlet opening 16. The lower surface 40 of body member bore 36 is slidably engaged by the surface 25 of valve member 20. In addition, the body member has a concentric, downwardly opening bore 42 whose inner surface 43 is substantially parallel to surface 40. A cylindrical aperture 44 is formed in body member 33 and extends between surfaces 40 and 43 in an eccentric, generally parallel relation relative to the rotary axis of valve member 20. The lower end of aperture 44 has an outwardly flared frusto-conical surface 45 whose purpose will be described below. In addition, a second opening 46 is formed in the cylindrical portion of body member 33 in registry with outlet opening 18 in body 11.

Suitable O-ring gaskets 47 and 48 are respectively disposed in grooves 49 and 50 formed on the outer surface of body member 33 and facing housing 11 and above and below the outlet opening 18 to suitably seal the same. The stem 30 is sealed to the closure member 31 by an O-ring gasket 51.

The lower surface 43 of the body member 33 is spaced from the lower surface of bore 14 to form a gap in which a resilient, generally cup-shaped sealing member 55 is disposed. Member 55 includes a generally circular base portion 56 whose outer diameter is substantially equal to the internal diameter of the bore 42 in body member 33 and is disposed in a generally coaxial relation therewith. In addition, member 55 includes an annular skirt portion 58 extending downwardly from the outer periphery of base portion 56 and in sealing engagement with the surface of bore 42. The upper surface 60 of sealing member 55 is generally planer and complimentary with the lower surface 43 of body member 33. In addition, a hollow, generally cylindrical portion 62 is integrally formed with and extends upwardly from the base portion 56 of member 55 and is eccentrically arranged for projecting into the aperture 44 formed in body member 33. The upper end 64 of cylindrical portion 62 engages the lower surface 25 of valve member 20 so that the interior surface of portion 55 defines a passage 66 through member 33. An integrally formed ring 68 on the outer surface of portion 55 engages the aperture 44 to provide a seal therewith.

As seen in FIGS. 1 and 3, the upper end 70 of valve member 20 has a generally cylindrical outside surface 71 which is coaxial with bore 36 of member 33 and, except for an enlarged portion 73, has a diameter which is reduced with respect to the said bore. The enlarged portion 73 of the valve member upper end 70 has an outer surface 74 which engages and is complimentary with the inner surface of bore 36. The sides of the enlarged portions 73 are defined by generally parallel chordal surfaces 76 and 77. In addition, the lower end of closure member 33 has a downwardly extending crescent shaped annular section 80 whose inner and outer surfaces 82 and 83 respectively correspond to the surface 71 of valve member 20 and the surface of bore 36 and lies therebetween. The opposite ends of section 80 are defined by generally co-planer chordal surfaces 85 and 86. It will thus be appreciated that the degree of angular rotation of valve member 20 will be limited by the engagement between surface 77 of valve member 20 with surface 86 of closure member 32 and rotation in the opposite direction will be limited by engagement between surface 76 and surface 85. Orientation of body member 33 is achieved and rotation thereof is prevented by integral lugs 90 which extend outwardly into axially extending slots 92 formed in the upper end of housing 11. Similar lugs 94 on closure member 31 also extend into slots 92 to prevent rotation of that member.

The closure member 31 may be suitably affixed within the bore 36 in any suitable manner such as by means of an internally threaded ring 96 which has an inwardly extending flange 97 which engages on the upper surface of member 31 and which is suitably threaded on external threads 98 formed at the upper end of housing 11. A suitable handle 99 may be secured in a conventional manner to the upper end of valve stem 30.

It will be appreciated by those skilled in the art that the lower end of inlet portion 12 will be suitably connected into a hot or cold water line while the opening 18 in housing 11 will be connected in a suitable manner to a common discharge spout (not shown) of conventional construction and which is likewise connected to a similar valve assembly coupled to the other water line.

When the valve member 20 is in its position shown in FIGS. 1-3, the opening 26 will be in registry with the passage 66 of sealing member portion 62 so that water may flow upwardly through inlet 12, passage 66 and opening 26 into the gap between the portions 21 and 22 of valve member 20 and outwardly through openings 46 and 18. When the valve member 20 is rotated approximately 180° from its position shown in FIGS. 1, 2 and 3 wherein the surface 76 will engage in surface 86 as seen in FIG. 3, the opening 26 will be out of registry with the passage 66 and water flow will be prevented. In the latter event, water pressure below the flexible sealing member 55 will urge the latter upwardly so that the surface 60 sealingly engages the surface 43 of valve member 20 and the outer surface of the skirt portion 58 will sealingly engage the bore 42 of body member 33. In addition, the gap between the portion 56 of sealing member 55 and the frusto-conical surface 45 of the surface and the gap between the outer surface of portion 62 and the aperture 44 permits the portion 62 to be distorted upwardly and outwardly to enhance the sealing with aperture 44 as well as between its upper edge 64 and surface 25.

It can also be seen in FIG. 2 that when the opening 26 and the passage 66 are in registry, the gap between valve portions 21 and 22 communicates with openings 18 and 46. Since the periphery of web portion 24 is recessed at 100, a gap 101 exists between it and the bore 36 of body member 33, as valve 20 is rotated 180° counterclockwise as seen in FIG. 2, communication between gap 101 and opening 18 will continue to exist while the opening 26 and passage 66 are in partial registry. While the opening 26 may take any convenient shape, the kidney-shaped opening 26 illustrated in FIG. 2 provides a metering action as the opening area moves across the circular opening defined by the upper edge 64 of passage 66.

Those skilled in the art will appreciate that the components of the faucet valve according to the present invention may be fabricated from conventional materials. For example, the housing 11, inlet 12 and stem 30 may be brass, the valve member 20, closure member 31 and body member 33 may be a suitable plastic and the sealing member 55 of a suitable rubber or artificial composition commonly employed for flexible seals.

While only few embodiments of the present invention have been shown and described, it is not intended to be limited thereby but only by the scope of the appended claims.

I claim:

1. A valve assembly including a housing, a body means within said housing including a cylindrical bore, an inlet opening formed in said housing and being in communication with said cylindrical bore, an outlet opening formed in said housing and said body means communicating with the side of said cylindrical bore in spaced relation from said inlet opening, a rotatable valve element disposed in said bore and in generally spaced relation from said inlet opening, said valve element having an outer cylindrical surface complementary with and slidably engaging the internal cylindrical surface of the bore, means for rotating said valve element about the axis of said bore, said valve element having an end face lying in a plane generally normal to said rotational axis and facing said inlet opening, a portion of said body means being disposed between said inlet opening and said end face of said valve element, said portion of said body means having a first surface portion lying in a plane normal to said rotational axis and being slidably engaged by said end face, said portion of said body means also having a second generally cup-shaped surface spaced from said first surface in the direction of said inlet opening, a first opening formed in the end face of said valve element, a passage formed in said portion of said body means and extending between said first and second surfaces thereof, a sealing element disposed adjacent said portion of said body means including a hollow tubular portion disposed within said passage and an end engaging said end face of said valve element and a cup-shaped portion of substantially greater diameter than said tubular portion, and conforming generally to the second surface of said portion of the body means, said tubular and said cup-shaped portion of said sealing element being assymetric with respect to each other, the tubular portion of said sealing member of said passage and the opening in said valve being nonconcentric relative to said rotational axis, rotation of said valve element causing movement of said element from a first position wherein said first opening and said tubular portion are in registry to provide a flow path between said inlet and outlet openings to a second position wherein said opening and tubular portion are out of registry, the existence of pressurized water at said inlet opening acting to hold said flexible sealing element against the walls of said passage and said tubular portion against said valve element to affect a seal therebetween.

2. The assembly set forth in claim 1 wherein the generally cup-shaped portion of said sealing element has a base portion conforming to the second surface of said portion of said body means and a skirt portion extending toward said inlet opening and from the periphery of said base portion, the outer surface of said skirt portion engaging the walls of said portion of said body means.

3. The assembly set forth in claim 1 wherein said tubular portion has seal means formed on its outer surface and engaging said passage, the remainder of said tubular portion being spaced from said passage, the cup-shaped portion of said sealing element being unsupported by said body means in the area around said passage.

* * * * *